(No Model.)

J. A. UPHAM.
SPLIT PULLEY.

No. 301,647. Patented July 8, 1884.

Witnesses:
Thos. Houghton.
A. M. Darrell

Inventor:
John A. Upham
By W. X. Stevens
Attorney.

UNITED STATES PATENT OFFICE.

JOHN A. UPHAM, OF EAST BROOKFIELD, MASSACHUSETTS, ASSIGNOR OF ONE-HALF TO JOSIAH HOBBS, OF SAME PLACE.

SPLIT PULLEY.

SPECIFICATION forming part of Letters Patent No. 301,647, dated July 8, 1884.

Application filed May 28, 1884. (No model.)

*To all whom it may concern:*

Be it known that I, JOHN A. UPHAM, a citizen of the United States, residing at East Brookfield, in the county of Worcester and State of Massachusetts, have invented certain new and useful Improvements in Split Pulleys; and I do hereby declare the following to be a full, clear, and exact description of the invention, such as will enable others skilled in the art to which it appertains to make and use the same.

This invention relates to that class of pulleys which are adapted to be parted in order that they may be placed upon a shaft anywhere without reference to the ends of the shaft; and it has for its object to produce a pulley of such form that its two halves may be cast from one and the same pattern, and so that the two halves will be bound together by the same set-screws which bind the pulley on the shaft, and by the act which tends to push the main body of the halves of the pulley apart.

To this end my invention consists in the construction and combination of parts forming a split pulley, hereinafter described and claimed, reference being had to the accompanying drawings, in which—

Figure 1:
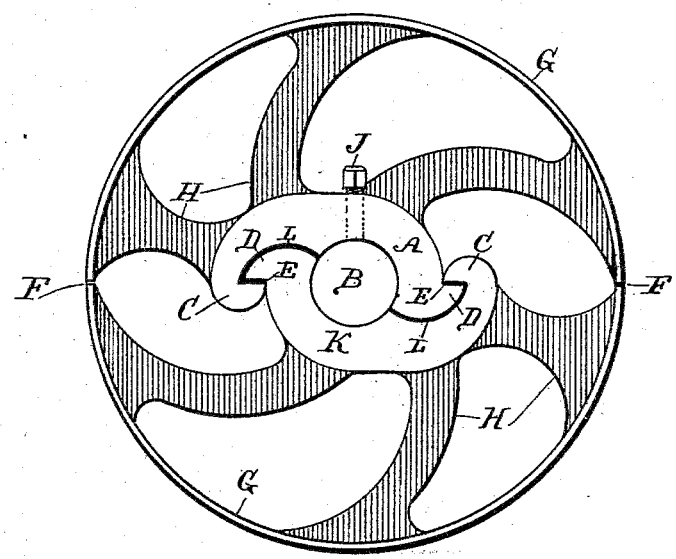
Figure 2:
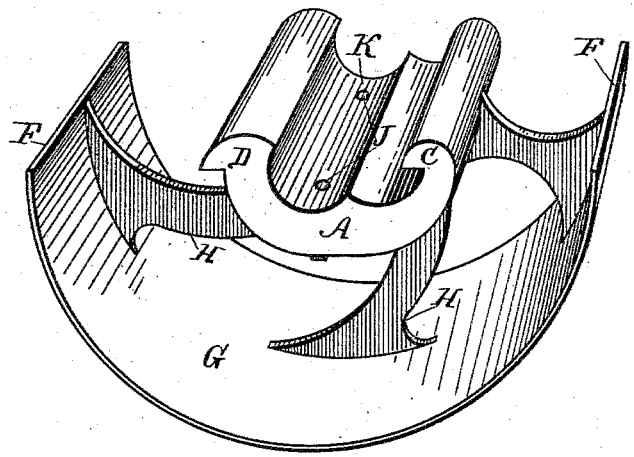

Figure 1 is an end elevation of a pulley according to my invention, and Fig. 2 is a perspective view of one-half of the same.

A represents the pulley-hub, which contains the main characteristics of my invention.

B is the hole for the shaft.

C and D are hooks, each adapted to engage a similar hook to the other when two half-pulleys are put together, as in Fig. 1. The two halves are put together by being inserted each into the other endwise. The points E E, being the inner edge of the parting, are diametrically opposite to each other; but they are not necessarily in the longitudinal plane of the hooks C D, nor of the parting F of the pulley-rim G.

The arms H of the pulley may be of any suitable number; or they may be dispensed with when the pulley is too small to require arms.

J represents the set-screws, of which there should be at least two in the length of each hub, both being in one half thereof, in order that the pulley may remain always round and concentric by being kept in the same relation to the shaft. This will necessarily be the result of always drawing the half-cylinder K against the shaft, the ends of the set-screws being against the opposite side of the shaft.

In making this pulley, but one pattern is used for both halves, and the casting is done in the usual manner. After properly cleaning two castings, they may be slipped together endwise, and secured in the position shown in Fig. 1, by means of wedges to be driven into the joint between the halves at the points L, at both ends of the hub, to force the hooks C D into proper engagement. When thus wedged tightly, the pulley will be bored and reamed in the usual manner to fit the hole B to receive the shaft. After the boring is completed, the wedges may be knocked out, the two halves parted, and the set-screw holes drilled from the center outward. By this method of drilling, no holes are required in the pulley-rims, and short drills will do the work. The tapping may also be done from the center. This is a great saving over the old tedious process of turning taps between the arms of pulleys, which is unavoidable with pulleys having whole hubs. The set-screws being fitted in place, they may be used to bind the pulley upon the arbor to be turned. The arbor being the same size as the shaft required, the pulley is sure to be true when transposed to the shaft after turning.

Pulleys may be so made very cheaply, and they may be put together or taken apart, either on or off the shaft, with the least possible labor.

Couplings for shafting may be made in the same manner as before described for small pulleys.

Of course keys might be substituted for the set-screws.

What I claim as my invention, and desire to secure by Letters Patent, is—

1. A pulley consisting of two parts, each provided with hooks adapted to engage the other, and one part provided with set-screws, substantially as shown and described, whereby the parts of the pulley are clamped together, by a force which tends to separate the main body of the two parts, for the purpose specified.

2. The half-pulley A, provided with hooks C and D, adapted to engage another similar half-pulley, substantially as shown and described, whereby the joining of two such halves forms a pulley.

In testimony whereof I affix my signature in presence of two witnesses.

JOHN A. UPHAM.

Witnesses:
JOSIAH HOBBS,
GEORGE E. FORBES.